United States Patent [19]

Dingle

[11] Patent Number: 5,226,371
[45] Date of Patent: Jul. 13, 1993

[54] MOBILE TANKER

[75] Inventor: Trevor Dingle, Bilpin, Australia

[73] Assignee: Hockney Pty Ltd., New South Wales, Australia

[21] Appl. No.: 859,076

[22] Filed: Mar. 27, 1992

[30] Foreign Application Priority Data

Mar. 27, 1991 [AU] Australia ............................... PK5333

[51] Int. Cl.⁵ ............................................... B61D 5/00
[52] U.S. Cl. ...................... 105/358; 105/360; 280/830; 280/831
[58] Field of Search ............... 105/355, 358, 359, 360, 105/361, 362, 404, 409; 219/86.1, 117.1, 118, 101, 104, 105; 280/830, 831, 834, 837, 838, 839; 296/15; 114/74 R; 220/553, 554

[56] References Cited

U.S. PATENT DOCUMENTS

| | | | |
|---|---|---|---|
| 2,026,501 | 12/1935 | Jensen | 280/838 |
| 2,231,317 | 2/1941 | Bernard | 219/118 |
| 2,239,507 | 4/1941 | Pierce | 280/838 |
| 2,417,337 | 3/1947 | Whitesell | 280/837 |
| 2,630,236 | 3/1953 | Arkoosh | 280/830 |
| 2,797,304 | 6/1957 | Donelan | 219/118 |
| 2,812,419 | 11/1957 | Chyle | 219/118 |
| 2,815,436 | 12/1957 | Bland | 219/118 |
| 3,712,502 | 1/1973 | Basier et al. | 280/837 |
| 4,251,005 | 2/1981 | Sons et al. | 280/831 |
| 4,789,170 | 12/1988 | Reber | 280/838 |

FOREIGN PATENT DOCUMENTS

| | | | |
|---|---|---|---|
| 0138037 | 10/1981 | Japan | 280/830 |
| 1211169 | 2/1986 | U.S.S.R. | 280/830 |

*Primary Examiner*—Mark T. Le
*Attorney, Agent, or Firm*—Willian Brinks Olds Hofer Gilson & Lione

[57] ABSTRACT

A mobile road or rail tanker. The tanker is formed of sheet aluminum which forms an outer shell. The shell encloses a chamber which is divided by a transverse wall. The wall adjacent the shell comprises an annealed heat treatable weldable aluminum alloy which is relatively soft and ductile so that weld material adjacent the wall is stronger than the remainder of the wall.

3 Claims, 1 Drawing Sheet

MOBILE TANKER

FIELD OF THE INVENTION

The present invention relates to mobile tankers and more particularly to road and rail tankers.

BACKGROUND OF THE INVENTION

In the design of road and rail tankers, consideration must be given to the ability of the tanker to resist fracture, rupture or puncture in the case of a roll-over or accident.

Previous tanker designs have included a circular, oliptical, oval or other similarly shaped outer shell within which there is located baffles and dividers. The dividers and/or baffles are welded to the shell. More particularly, where the tanker is of an aluminum construction, the dividers (bulkheads) and/or baffles are formed of non-heat treatable work hardening alloys. When welded to the outer shell, the weld and surrounding material is not as strong as a divider or baffle.

When tankers constructed in accordance with the above are involved in an accident in which the tanker is subjected to an impact, the shell frequently ruptures or tears adjacent the weld due to the strength of the divider or baffle relative to the weld and its surrounding material.

OBJECT OF THE INVENTION

It is the object of the present invention to overcome or substantially ameliorate the above disadvantages.

SUMMARY OF THE INVENTION

A mobile aluminum tanker comprising:

an outer shell of aluminum sheet material, enclosing a chamber to receive a liquid to be transported by the tanker;

at least one wall extending transversely across said chamber and welded to opposite internal surfaces of said shell; and wherein at least the portions of said wall adjacent said shell consist of an annealed heat treatable weldable aluminum alloy which is relatively soft and ductile so that weld material and adjacent wall portions are stronger than the remainder of the wall surrounding said adjacent wall portions.

DETAILED DESCRIPTION OF THE PRESENTLY PREFERRED EMBODIMENT

Figure 1:
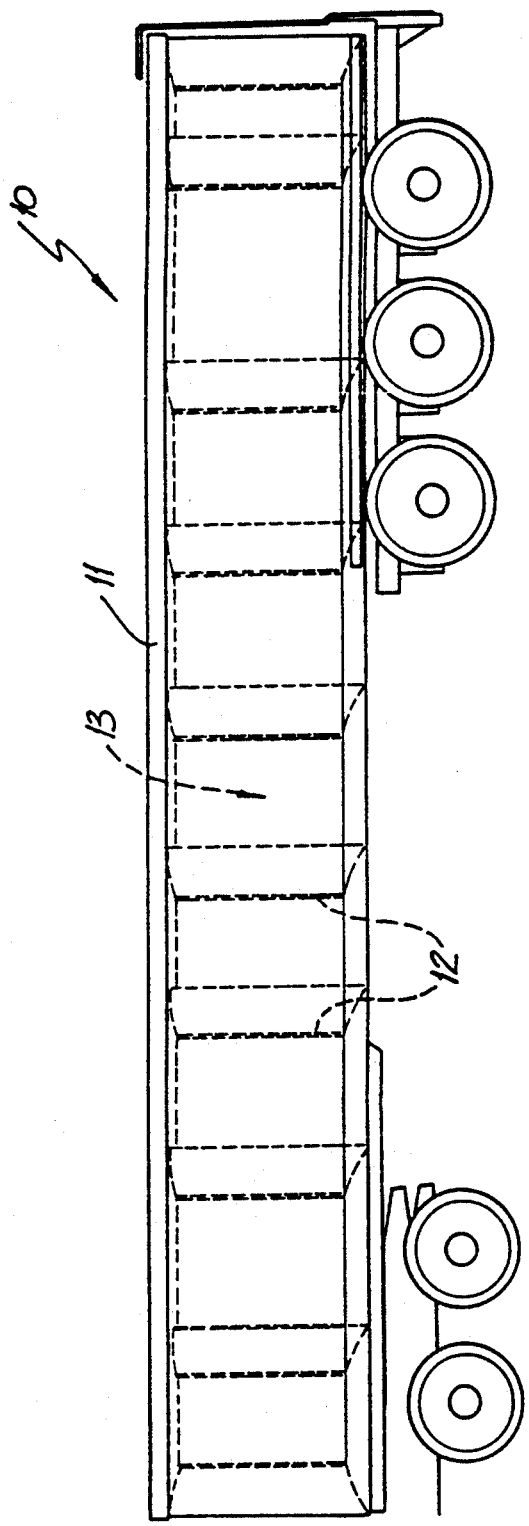
FIG. 1 is a schematic side elevation of a road tanker.
Figure 2:
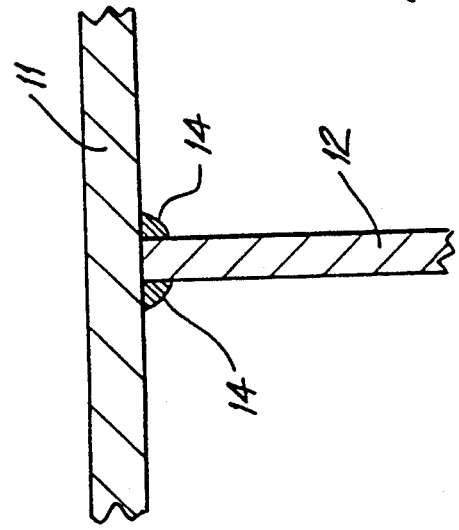
FIG. 2 is a schematic enlarged portion of the tanker of FIG. 1.

A preferred form of the present invention will now be described by way of example with reference to the accompanying drawings.

In the accompanying drawings there is schematically depicted an aluminum road tanker 10 having an outer shell 11 formed of aluminium sheet material. The outer shell 11 encloses a chamber 13 to receive a liquid, such as petrol, to be transported by the tanker 10.

Extending transversely across the chamber 13 and welded to opposite sides of the internal surfaces of the shell 11, are dividers 12. In the present example, the dividers 12 are formed from a single sheet of aluminum material.

The dividers 12 are formed of an annealed heat treatable weldable aluminum alloy which is relatively soft and ductile. Joining the dividers 12 to the shell 11 are weeds 14.

The benefit in the above described means of securing the dividers 12 to the shell 11 is that on welding the annealed heat treatable alloy to the shell, the weld and heat affected zone will be partially heat treated and therefore stronger than the annealed material of the remainder of the divider 12. Consequently, if the shell 11 is impacted, the dividers will collapse (buckle) rather than have the shell 11 shearing away from the dividers 12. This in turn inhibits rupturing of the shell 11 and therefore prevents spillage of the liquid contained within the chamber 13.

It should be appreciated that the dividers 12, bulkheads or baffles secured to the shell in the above described manner, need only have the edge portions formed of an annealed heat treatable weldable aluminum alloy which is relatively soft and ductile.

I claim:

1. A mobile aluminum tanker comprising:
    an outer shell of an aluminum sheet material, enclosing a chamber to receive a liquid to be transported by the tanker;
    at least one wall extending transversely across said chamber and welded with weld material to opposite internal surfaces of said shell; and
    wherein at least portions of said wall adjacent said shell comprise an annealed heat treatable weldable aluminum alloy which is relatively soft and ductile so that the weld material and adjacent wall portions are stronger than the remainder of the wall surrounding said adjacent wall portions.

2. The tanker of claim 1, wherein the entire wall is formed of an annealed heat treatable weldable aluminum alloy which is relatively soft and ductile.

3. A mobile tanker comprising:
    an outer aluminum shell enclosing a chamber; and
    at least one wall extending across the chamber and welded to an internal surface of the shell;
    wherein at least portions of the wall comprise an annealed heat treatable aluminum alloy and wherein the wall further comprises a heat treated first portion and a non-heat treated second portion, the first portion being in proximity to the shell; and the second portion being farther away from the shell.

* * * * *

UNITED STATES PATENT AND TRADEMARK OFFICE
CERTIFICATE OF CORRECTION

PATENT NO.   : 5,226,371
DATED        : July 13, 1993
INVENTOR(S)  : Trevor Dingle It is certified that error appears in the above-indentified patent and that said Letters Patent is hereby corrected as shown below:

Title page, item (56):
IN THE REFERENCES CITED

On the title page, column 2, under "U.S. PATENT DOCUMENTS", on the line following the 2,815,436 (Bland) reference, insert:

--3,131,949     5/1964    Black ............ 280/5--.

On the title page, column 2, under "FOREIGN PATENT DOCUMENTS", on the line following the 1211169 (U.S.S.R.) reference, insert:

--1 411 089     8/1965    France
  1 527 799    10/1978    Great Britain--.

Signed and Sealed this

Seventh Day of June, 1994

Attest:

BRUCE LEHMAN

*Attesting Officer*     *Commissioner of Patents and Trademarks*